Nov. 24, 1936.  A. P. LEWIS ET AL  2,062,008

UNIFORM TENSION DEVICE

Filed July 31, 1935  5 Sheets-Sheet 2

INVENTOR
Arthur P. Lewis &
William J. Secrest
BY
Albert L. Ely
ATTORNEY

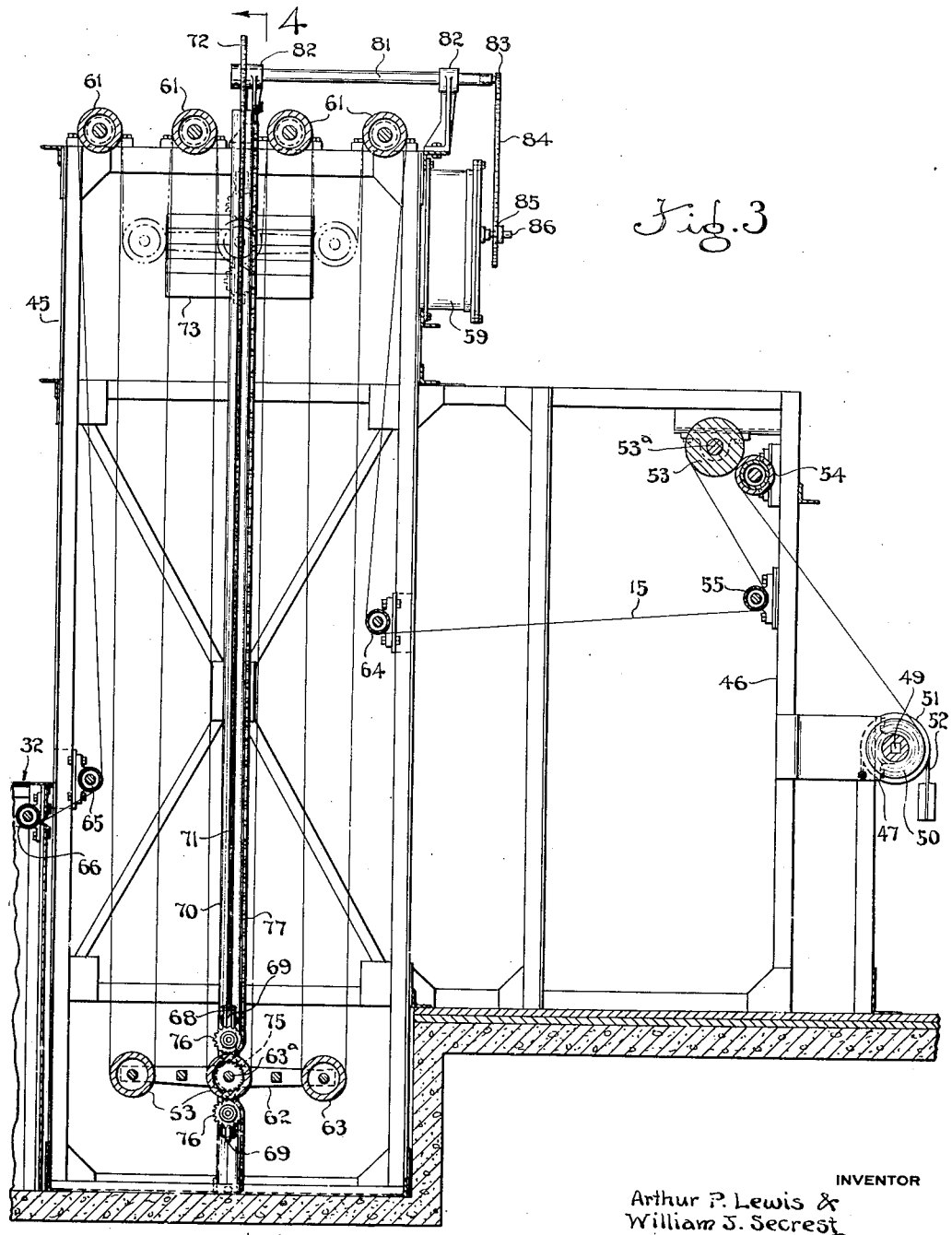

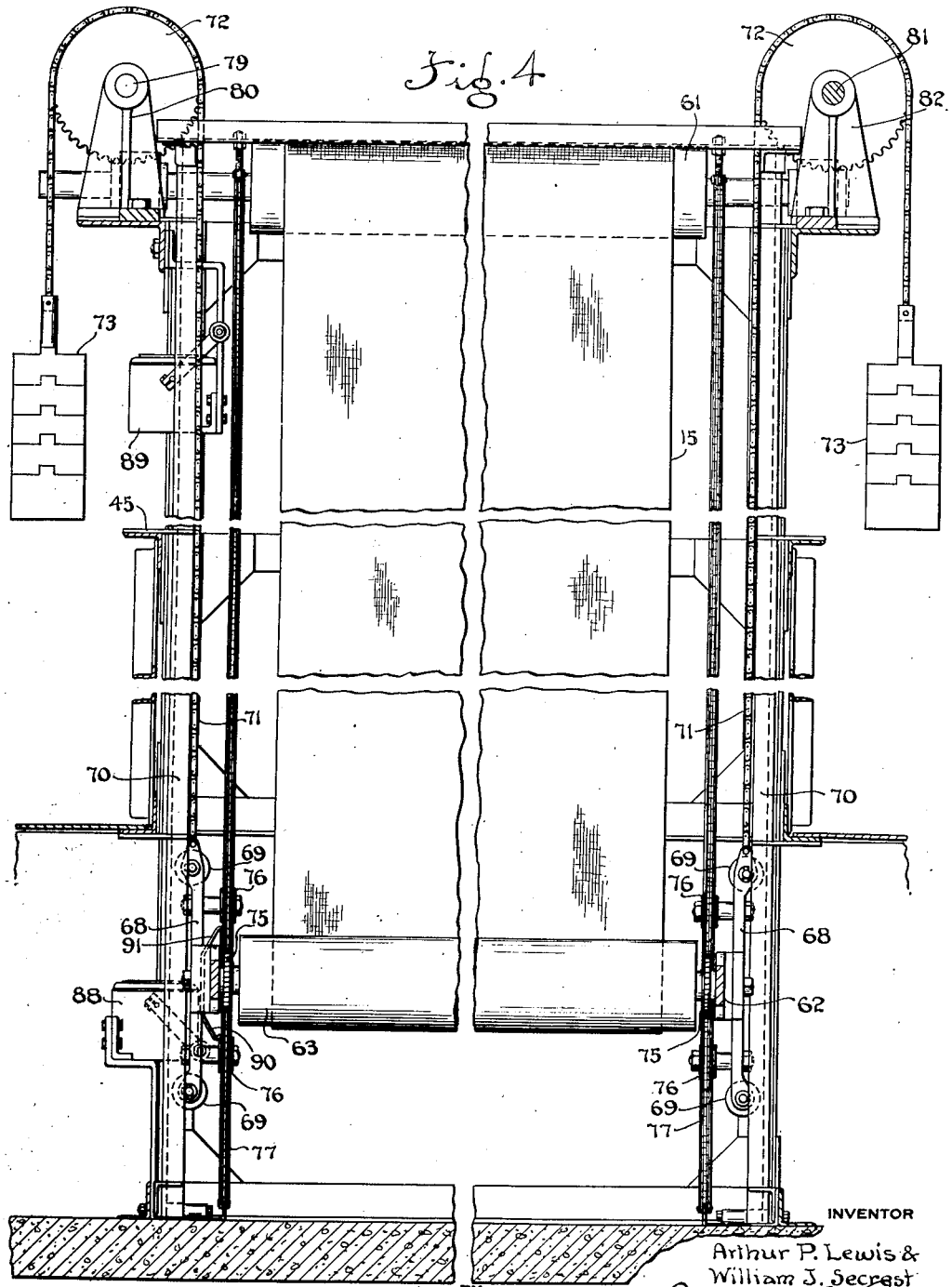

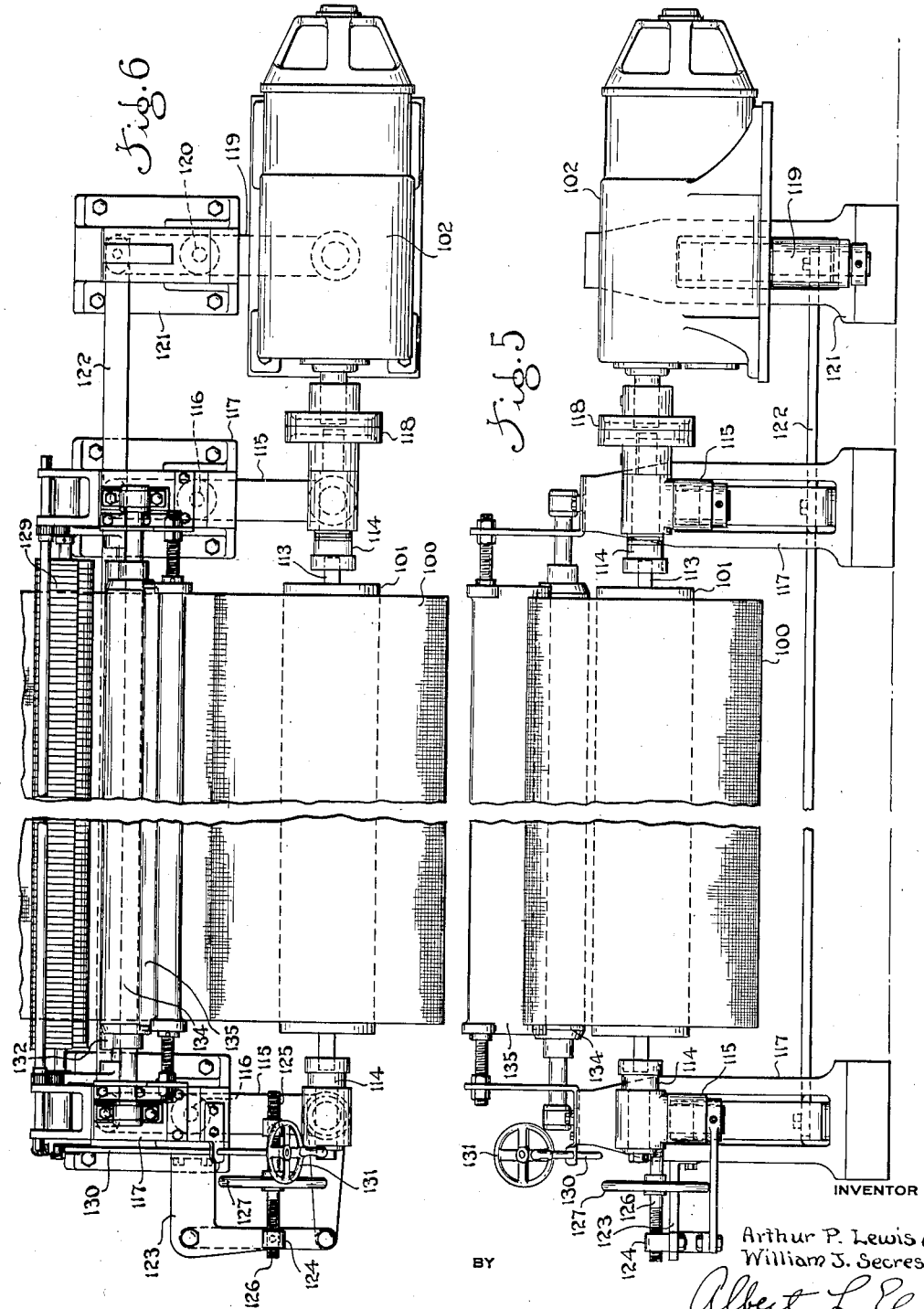

Patented Nov. 24, 1936

2,062,008

UNITED STATES PATENT OFFICE 2,062,008

UNIFORM TENSION DEVICE

Arthur P. Lewis, Fair Haven, Mass., and William J. Secrest, Cuyahoga Falls, Ohio, assignors to The Firestone Tire & Rubber Company, Akron, Ohio, a corporation of Ohio Application July 31, 1935, Serial No. 33,994

2 Claims. (Cl. 242—58)

This invention relates to uniform tension devices, and more especially it relates to devices for maintaining a constant uniform tension in continuous strip material that is unwound from one roll thereof, treated or processed while off said roll, and then rewound upon another roll.

The invention is of major importance in the rubber industry, for example, in apparatus for processing tire building fabric. In a method of preparing rubberized, weak-wefted cord fabric for tire casings that comprises initially impregnating the cords of the fabric with rubber composition in solution, there is provided impregnating apparatus comprising a bath of viscous rubber composition, and a drying chamber through which the impregnated fabric passes, the feed of the fabric being constant. Fabric to be impregnated is withdrawn from a roll of the fabric, and since this roll becomes exhausted and requires to be replaced by a new roll, suitable fabric-storage means is provided between the supply roll and the drying chamber so that fabric may be withdrawn from the storage means during the interval required for replacing an exhausted supply roll with a fresh one. In like manner a fabric-storage means is positioned at the work-delivery end of the apparatus for receiving and storing fabric from the drying chamber during the interval required to remove a full roll of impregnated fabric and replace it with an empty roll-shell.

Both the fabric supply roll at the work-receiving end of the apparatus and the rewinding roll at the work-delivery end of the apparatus are power driven, and, because said rolls vary in diameter as fabric is removed therefrom or wound thereon, it is necessary to provide means for constantly adjusting the speed of rotation of said rolls in order to maintain a constant uniform tension on the fabric. The means by which the speed of rotation of said fabric rolls automatically is adjusted constitutes the subject matter of this invention.

The chief objects of the invention are to produce processed tire fabric of uniform quality; to produce tire fabric of determinate stretch and crimp; to obviate mis-cuts in the subsequent cutting of continuous tire fabric into tire-building plies; and to avoid waste of tire fabric from causes arising from improper processing. More specifically the invention aims to provide means by which continuous tire building fabric may be rubber-impregnated while under constant, uniform, determinate tension. Other objects will be manifest.

Of the accompanying drawings:

Figure 3 is a section on the line 3—3 of Figure 2;

Figure 4 is a section on the line 4—4 of Figure 3;

Figure 5 is an elevation of fabric-rewind mechanism at the work-delivery end of the machine; and Figure 6 is a plan view of the apparatus shown in Figure 5.

Figure 1:
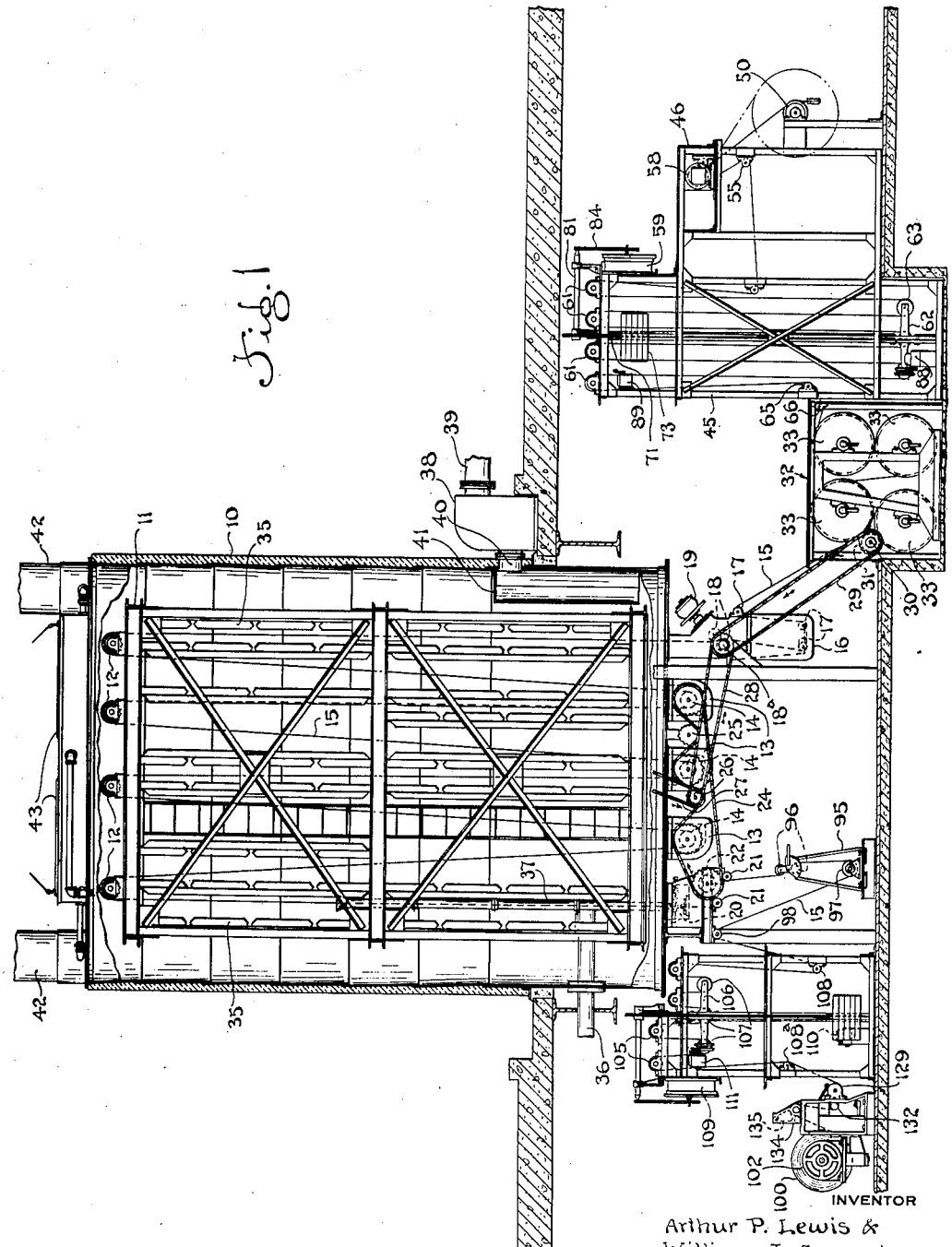
Figure 1 is a side elevation of apparatus embodying the invention, in its preferred form, a part thereof being broken away for clearness of illustration.
Figure 2:
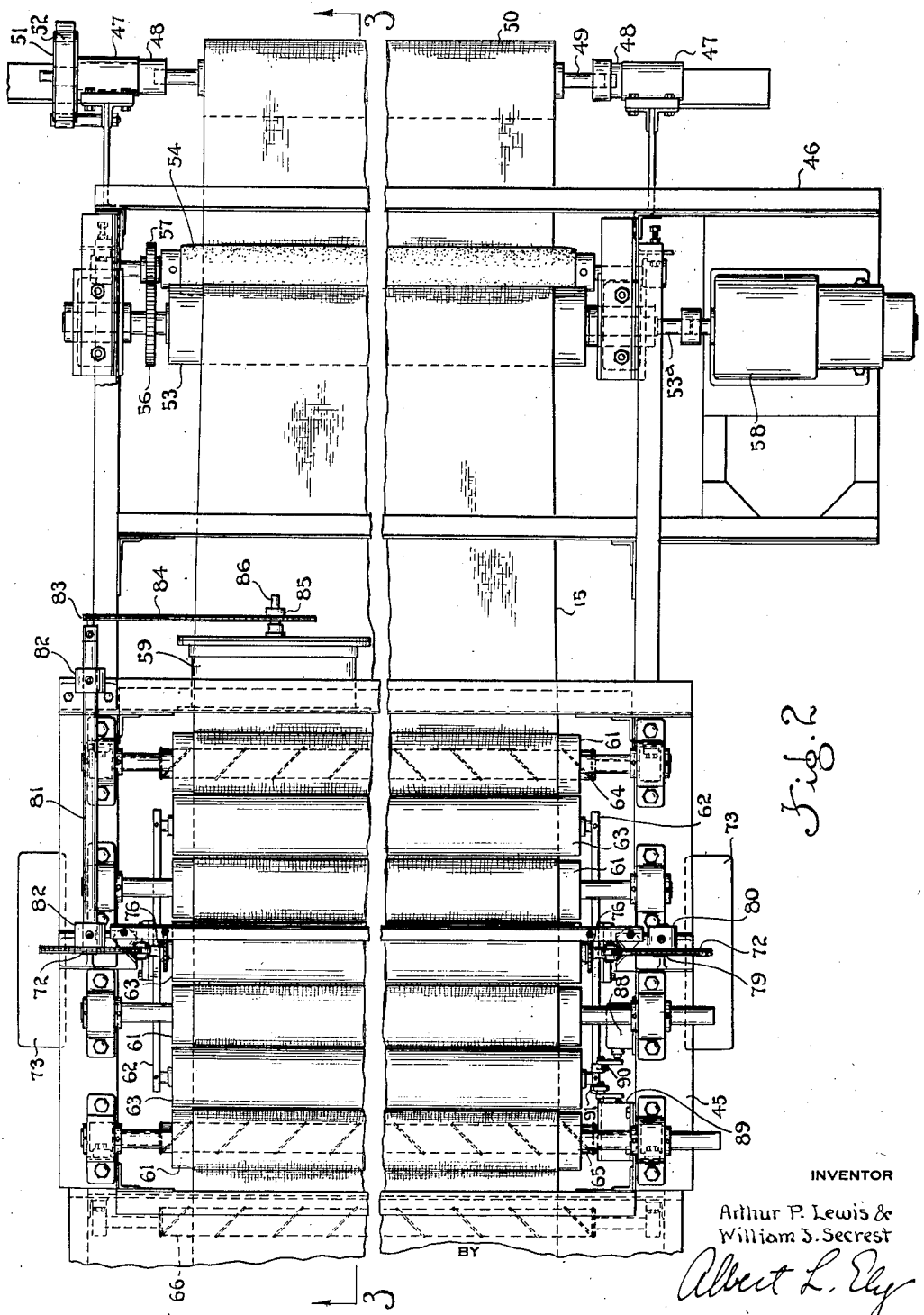
Figure 2 is a plan view of the uniform tension mechanism at the work receiving end of the apparatus.

Referring now to Figure 1 of the drawings, 10 is a vertically arranged, tall, tubular housing within which is mounted an open framework 11 that carries a plurality of work supporting rollers 12, 12 journaled at the top thereof. Mounted in suitable receptacles 13, that are secured to the bottom of the housing 10 and open to the interior of the latter, are respective work-driving rollers 14, 14, the work, consisting of a continuous strip of weak-wefted cord fabric 15, being threaded in alternation over the rollers 12 and under the rollers 14 is a plurality of festoons. At the work receiving end of the apparatus is a container 16 filled with liquid rubber composition consisting of rubber dissolved in a hydrocarbon solvent, and the fabric 15 is guided through said liquid composition by means of guide-rollers 17, 17. Said container also includes a pair of squeeze-rolls 18, 18 located above the level of the liquid and through which the fabric 15 is drawn to remove excess impregnating composition therefrom. The liquid in the container 16 constitutes a seal to prevent the escape of a work-drying medium in the housing 10, and the level of said liquid is kept substantially constant by mechanism that automatically and periodically admits liquid into said container, said mechanism being controlled by a valve 19. At the work-delivery end of the housing 10 is a seal 20 of known construction through which the fabric 15 is withdrawn from said housing said seal also serving to wipe loose lumps of rubber from said fabric. Immediately outside the seal 20 are guide rollers 21, 21, and a feed roller 22 about which the work passes.

The fabric 15 is fed through the housing or drying chamber 10 at a constant, uniform speed, and to this end the adjacent ends of the shafts of the several rollers 14 and the roller 22 are provided with suitable sprockets about which is trained a sprocket chain 24, the latter also passing about an idler sprocket 25, and about a sprocket on a power driven shaft 26. A second sprocket or shaft 26 is connected by a sprocket chain 27 with an electric motor (not shown), and a third sprocket on said shaft 26 is connected by a sprocket chain 28 with a sprocket on the shaft 18a of one of the squeeze-rolls 18. A second sprocket on the shaft 18a is connected by a sprocket chain 29 with a sprocket on the shaft 30 of a feed roller 31 that is associated with a fabric drier 32 at the work-receiving end of the apparatus, said drier comprising rotatable, steam heated drums or cylinders 33, 33 about which the fabric is drawn by said feed roller.

Interiorly of the housing 10 are steam-heated coils 35, 35 that are suitably arranged between the festoons of fabric and serve to volatilize the solvent in the composition with which the fabric is impregnated. In order to prevent the solvent vapor from forming an explosive mixture in the housing 10, an inert gas, such as carbon dioxide gas, is introduced thereinto. To this end the inert gas is conducted into the housing through pipe 36 that is connected with a suitable source of supply (not shown) of said gas, said pipe discharging into an elongate manifold 37 that surrounds the last festoon of fabric, said manifold discharging into the housing chamber at its upper end. The gaseous mixture of carbon dioxide and solvent vapor is withdrawn from the housing chamber at a point diametrically opposite the gas inlet, and conducted to a suitable apparatus (not shown) where the solvent is recovered from the mixture.

For withdrawing the mixture from the housing, a suction fan 38 positioned outside the housing has connection with the said recovery apparatus through pipe 39, and has connection with the interior of the housing through pipe 40 that extends through the wall of the latter. A suitable baffle 41 is positioned in front of the inlet to pipe 40 to prevent the fabric 15 from being drawn thereinto. The rate of inflow of carbon dioxide and the rate at which the mixture is withdrawn are so coordinated that the mixture within the housing is at low super-atmospheric pressure. The arrangement is such that in case of leakage of the housing there will be an escape of the mixture therefrom rather than the admission of air thereinto, thus avoiding the possibility of creating an explosive mixture in the housing. Excessive pressure in the housing chamber is prevented by the provision of a pair of vents 42, 42 at the top thereof, said vents being provided with water-sealed relief valves (not shown). The housing may also be provided with weak explosion panels 43, 43 at the top thereof.

The apparatus for applying tension to the fabric 15, at the work-receiving end of the apparatus, comprises an open framework 45 that is positioned at the receiving side of fabric drier 32, there being a smaller, subsidiary framework 46 associated with framework 45 on the side thereof that is remote from said drier. Mounted upon the framework 46 is a pair of bearing brackets 47, 47 in which are journaled respective spindles 48 for receiving and supporting a square axial bar 49 that carries a supply roll 50 of the fabric 15. A brake drum 51 is mounted upon one of the spindles 48, and a weighted brake band 52 engages said brake drum for preventing rotation of supply roll 50 except when the fabric 15 is pulled therefrom. Fabric is withdrawn from the supply roll 50 by a pair of driven feed rollers 53, 54 that are suitably journaled in the upper part of framework 46. There is a guide-roller 55 journaled on the framework 46, below the said feed rollers, the rollers 54, 55 being so arranged with relation to roller 53 as to guide the fabric 15 about roller 53 in engagement with about three-fourths of the surface of the latter, whereby good driving friction between the roller and the fabric is assured.

Feed rollers 53, 54 are geared together by meshed gears 56, 57 so that they are driven in unison, and the shaft 53a of roller 53 is coupled to the shaft of an electric motor 58 suitably supported in the upper part of framework 46. The speed of the electric motor 58 is controlled by a rheostat that is located in a sealed box 59 that is mounted upon framework 45, and the operation of the rheostat is effected by fabric-storage means carried by said framework, as presently will be explained.

Journaled in the top of framework 45 is a plurality of horizontal, fabric-supporting rollers 61, 61, herein shown as four in number, and vertically movable within said framework is a floating frame 62 which carries three rollers 63, 63 that are disposed in the same horizontal plane and are journaled on respective shafts carried by the floating frame. The arrangement is such that the fabric strip 15 when passed over the rollers 61 and under the rollers 63, in a series of festoons, will support the floating frame 62, and the elevation of said floating frame will be governed by the amount of fabric in said festoons. On the work-receiving side of framework 45, at an intermediate height thereon, is journaled a tentering roller 64 of the well-known type having a right hand and left hand raised rib on its surface, the fabric 15 passing about said rolller 64 as it moves from the guide roller 55 to the adjacent festoon roller 61. A similar tentering roller 65 is journaled on the framework 45 at the work-delivery side thereof and guides the outgoing fabric from the last festoon roller 61 of the series to a tentering roller 66 associated with the drier 32.

The floating frame 62 is provided at its opposite sides with respective, vertically disposed brackets 68, 68, and each of the latter has a disc-roller 69 journaled in its opposite ends, as is most clearly shown in Figure 4. The disc-rollers 69 on the respective brackets engage in a channeled or angular vertical guide 70, which guides are secured to the framework 45 on opposite sides thereof. Connected to the upper ends of the respective brackets 68 are respective sprocket chains 71, 71, which sprocket chains extend to the top of the framework and pass over respective sprockets 72, the free end of each chain being connected to a counterweight 73. The weight of the latter may be varied, and optimum condition obtains when the floating frame is slightly heavier than its counterweights, so that it will sink by gravity and draw fabric into the festoons when the input of fabric from the supply roll 50 is greater than the outgo to the drier 32. Conversely, the floating frame easily is lifted without imposing any considerable strain on the fabric when the fabric is withdrawn from the festoons faster than it is fed thereinto, which condition obtains when the motor 58 is stopped to permit an exhausted supply roll to be replaced by a new supply roll 50 of fabric.

In order to prevent the floating frame 62 from tilting so that one end of the rollers 63 thereof is higher than the other end, the shaft 63a (Figure 3) upon which the middle roller 63 is journaled is itself journaled in the frame 62, and has sprockets 75, 75 mounted upon its respective end portions adjacent the ends of said roller 63. In vertical alignment with sprockets 75, above and below the same, sprockets 76, 76 are journaled upon the respective brackets 68. The sprockets 75 are engaged by respective vertically disposed sprocket chains 77, 77 that are fixedly secured to the floor and to the top of framework 45, the sprockets 76 serving to guide the chains about said sprockets 75 and hold them thereagainst. The arrangement is such that any movement of the floating frame 62 at either end thereof will cause rotation of shaft 63a and thereby cause concurrent movement of the other end of the frame by reason of the movement of sprocket 75 along sprocket chain 77, with the result that the floating frame always maintains its horizontal position.

One of the sprockets 72 aforementioned is mounted upon a stub shaft 79 that is journaled in a bearing bracket 80 upon the top of framework 45. The other sprocket 72 is mounted upon one end of a shaft 81 that is journaled in a pair of spaced brackets 82, 82, there being a sprocket 83 mounted upon the other end of shaft 81 and connected by sprocket chain 84 to a sprocket 85 on the rotatable shaft 86 of the rheostat within the sealed box 59, said shaft projecting from the front of said box. The arrangement is such that while the floating frame 62 is rising the rheostat shaft 86 is slowly rotated to effect a speeding up of the motor 58, the speed of said motor being progressively slowed down by the downward movement of the floating frame. Thus the speed of motor 58 is in direct proportion to the ratio of outfeed to infeed of fabric into the storage mechanism comprising the festoons and floating frame.

Near the bottom of framework 45 is a limit switch 88 that is electrically connected to the motor 58 for stopping the same. Near the top of framework 45 is another limit switch 89 that is electrically connected to the motor (not shown) that drives the festoons of impregnated fabric within the housing 10. The operating arms of switches 88, 89 extend into the paths of a pair of cams 90, 91 that are mounted upon the floating frame 62 and are adapted to engage and actuate the operating arms of the respective switches 88, 89, when the floating frame is at its lowermost position as shown in full lines in Fig. 3, or at its uppermost position as shown in broken lines in the same figure. The arrangement is such that when the storage festoons are substantially full the motor 58 automatically is stopped so as to discontinue the infeed of fabric, and when the fabric is substantially all withdrawn from the festoons the motor that withdraws it therefrom automatically is stopped.

In the normal operation of the apparatus previously described, the rate of the infeeding of fabric into the storage festoons is substantially the same as the speed of withdrawal therefrom when the floating frame 62 is near the bottom of its course of travel, as shown in the drawings. Any differential of infeed and outfeed such as would cause the said floating frame to rise or fall operates the rheostat within the box 59 and thus correspondingly speeds up or slows down the motor 58 until equilibrium again is effected. When the fabric in supply roll 50 is exhausted, the motor 58 is manually stopped, the friction between the fabric and feed rollers 53, 54 preventing any more of the fabric being drawn into the storage festoons by the weight of the floating frame 62. The outfeed from said festoons is continuous, and when the infeed of fabric stops as described, said outfeed gradually depletes the festoons and lifts the floating frame. Usually the time required to lift the floating frame to the top of framework 45 is sufficient to permit the removal of the exhausted roll-shell, the mounting of a fresh supply roll of fabric, and the connecting of the leading end of the fabric of said roll to the trailing end of the fabric of the preceding roll. If the latter operations require too much time, the outfeeding of the fabric will stop when the floating frame 62 operates the upper limit switch 89. When the motor 58 again is started, its speed, due to the position of the floating frame, is such that the fabric is fed into the storage festoons at greater lineal speed than it is withdrawn therefrom, with the result that the floating frame gradually moves downward by gravity. This progressively slows down the speed of motor 58 until equilibrium once more is established as the floating frame approaches its lowermost position. The fabric withdrawn from the storage festoons is drawn continuously through the impregnating composition in container 16 and through the chamber in housing 10 as previously described.

At the work-delivery end of the housing 10, below the same, is a bracket 95 that carries a pair of tacky gum-spot rollers 96, 96 in the top thereof, which rollers are angularly adjustable as a unit to vary the tension of the fabric passing about them. The function of the rollers 96 is to engage opposite faces of the impregnated fabric 15 and to remove gum-spots or loose strands of lint therefrom. The bracket 95 also carries a spreader roll 97 near its base and about which the fabric is drawn. There is a guide roller 98 journaled on the supporting structure of housing 10 about which the fabric passes after passing about spreader roll 97.

At the work-delivery end of the apparatus the impregnated fabric 15 is wound into a roll 100 upon a rewinding shell 101, the latter being driven by an electric motor 102. Associated with the rewinding apparatus, between the latter and the housing 10 is a fabric storage device that is substantially identical with that previously described at the opposite end of the apparatus, so that only a brief description thereof will suffice.

Said storage device comprises an open framework 104, a series of stationarily journaled rollers 105, 105 at the top thereof, a floating frame 106, and a series of rollers 107, 107 journaled on said floating frame, the impregnated fabric 15 passing over the rollers 105 and under the rollers 107 in a succession of festoons. There is a spreader roll 108 journaled on framework 104 at an intermediate position for guiding the fabric 15 from the guide roller 98 aforementioned to the nearest festoon roller 105, and a similar spreader roller 108a is journaled on the opposite side of the framework for engagement with the fabric after the latter passes from the last of the series of festooning rollers 105. The floating frame 106 rises and falls accordingly as the fabric is withdrawn from the festoons onto the rewinding shell 101 at a greater or lesser speed than it is fed into the festoons after delivery from the housing 10.

This vertical movement of the floating frame 106 is utilized for operating a rheostat (not shown) that is mounted in a sealed box 109 on the framework 104, the mechanism connecting the floating frame with the said rheostat being identical with that provided for the same purpose at the opposite end of the apparatus. The said rheostat controls the speed of the motor 102, the arrangement being such that the speed of the motor is slowed down as the floating frame rises and accelerated as the said frame sinks. Associated with the storage device is a lower limit switch 110 adapted to be operated by the floating frame 106 at the lowermost limit of its range of travel, and an upper limit switch 111 operable by said floating frame at the uppermost limit of its range of travel. Operation of limit switch 110 stops the motor (not shown) that drives the festoons of impregnated fabric within the housing 10. Operation of limit switch 111 stops motor 102.

In the operation of the storage means described at the delivery end of the apparatus, the floating frame normally occupies a position near its uppermost limit of travel, as shown in Figure 1, the fabric being withdrawn from the festoons substantially at the same rate that it is being drawn thereinto. When the rewind shell 101 is full of finished fabric, the motor 102 is manually stopped, the roll of fabric 100 is removed from the machine and replaced by an empty shell 101, the end of the continuous strip of fabric 15 is started onto the empty shell, and the motor 102 manually started. During the interval required to remove the full shell 101 and replace it with an empty shell, fabric from the housing 10 is being drawn into the storage festoons by the weight of the floating frame 106, the latter moving downwardly. Usually there is ample time to mount the empty shell 101 in the apparatus before the floating frame reaches the lowermost limit of its movement. The downward movement of the floating frame turns the rheostat in box 109 so that when the motor 102 again is started, it rotates at accelerated speed sufficient to withdraw fabric from the storage device slightly faster than it is drawn thereinto, thus causing the floating frame 106 to rise.

The fact that the roll of rewound fabric 100 constantly increases in diameter also tends to increase the speed at which fabric is withdrawn from the storage device. Opposed to said speed-increasing factors is the rheostat in box 109 which automatically is turned by the rising floating frame so as constantly to diminish the speed of the motor 102. Where said floating frame is adjacent the uppermost limit of its course of travel, the outgoing lineal speed of the fabric in the storage device is substantially equal to its incoming speed.

Details of the fabric-rewinding mechanism are shown in Figures 5 and 6 of the drawings to which attention now is directed. The rewinding shell 101 is mounted upon a square shaft 113 that is removably supported at its respective ends in spindles 114, 114 that are journaled in the outer ends of respective bracket arms 115, 115 that are pivotally mounted at 116, 116 upon respective brackets 117, 117. One of the spindles 114 is coupled at 118 to the driving shaft of motor 102 that is axially aligned therewith, said motor being mounted upon the outer end of a bracket arm 119 that is pivotally mounted at 120 upon a bracket 121. The bracket arms 115, 115, and 119 have extensions rearwardly of their respective pivots, which extensions are pivotally connected by a link 122, the arrangement constituting a parallel motion mechanism whereby the rewinding shell 101 and motor 102 may be moved axially as a unit to center the shell with relation to the fabric 15 being delivered thereto. For so moving the said shell and motor axially, a laterally projecting angular arm 123 is mounted upon the bracket 117 that is farthest from motor 102, the free end of said arm having a nut 124 swivelled on the top face thereof. A similar nut 125 having opposite hand threads is swivelled on the top face of adjacent bracket arm 115. A screw 126 formed with right and left-hand threads is threaded through the respective nuts 124, 125, and is provided in its medial region with a hand wheel 127 whereby it may be manually turned, whereby the bracket arm 115 is moved angularly and the position of the rewinding shell 101 is altered.

Journaled between the brackets 117, in position to engage the fabric 15 as it comes from roller 108 on the framework 104, is a segmental spreader roll 129 of well-known construction adapted fully to spread the fabric before the latter passes onto the shell 101. Said spreader roll is provided with the usual adjusting means controlling the extent of its spreading effect upon the fabric, said adjusting means including a rotatable post 130 that is provided with a hand-wheel 131. A guide roller 132 is associated with the spreader roll 129 for limiting the area of engagement between the spreader roll and the fabric.

Journaled atop of the brackets 117 is a guide roller 134 over which the fabric moves in passing from guide roller 132 to the shell 101. Pivotally mounted above guide roller 134 is a weighted eccentric 135 that rests upon the fabric 15 passing over roller 134. The arrangement is such that the fabric may be drawn under the eccentric in one direction, that is, in moving toward the rewind shell 101. Any recession of the fabric causes the eccentric to move angularly and bind against the roller 134 thus pinching the fabric thereon and preventing further recession of the fabric. The arrangement prevents the end of the fabric from being pulled backward during the interval that a full shell of fabric is being removed from the apparatus and an empty shell placed therein.

From the foregoing description it will be seen that the fabric 15 may be fed continuously through the impregnating composition in container 16 and through the drying chamber in housing 10 without such stopping as would cause the fabric to adhere to the guide rollers therein and thus cause damaging irregularities in the coating of the fabric. The feature of mounting the rheostats in sealed boxes makes for safety since there may be vaporized solvent about the apparatus, and any sparks in such atmosphere would be dangerous. For this reason the several motors used with the apparatus are of a special type known as sparkless.

The invention results in substantial savings by avoiding the production of damaged fabric, the fabric produced is of uniform stretch and quality, and the other objects set out in the foregoing statement of objects are achieved.

Modification may be resorted to without departing from the spirit of the invention or the scope of the appended claims.

What is claimed is:

1. In uniform tension apparatus, a fabric storage device comprising a series of fixed rollers, and a series of rollers upon a horizontal, vertically movable floating frame, said rollers supporting a continuous strip of fabric in a plurality of festoons, means for feeding fabric into said festoons, means for withdrawing fabric from said festoons, and means for maintaining said floating frame in horizontal position, said means engaging opposite ends of a shaft on said floating frame, on which shaft one of the rollers on said floating frame is mounted.

2. In uniform tension apparatus, a fabric storage device comprising a series of fixed rollers, and a series of rollers upon a horizontal, vertically movable floating frame, said rollers supporting a continuous strip of fabric in a plurality of festoons, means for feeding fabric into said festoons periodically, means for withdrawing fabric from said festoons continuously, and means for maintaining said floating frame in horizontal position, said means comprising sprockets mounted upon opposite ends of a shaft on said floating frame, on which shaft one of the rollers on said floating frame is mounted, and respective sprocket chains with which said sprockets are engaged.

ARTHUR P. LEWIS.
WILLIAM J. SECREST.